Figure 1:
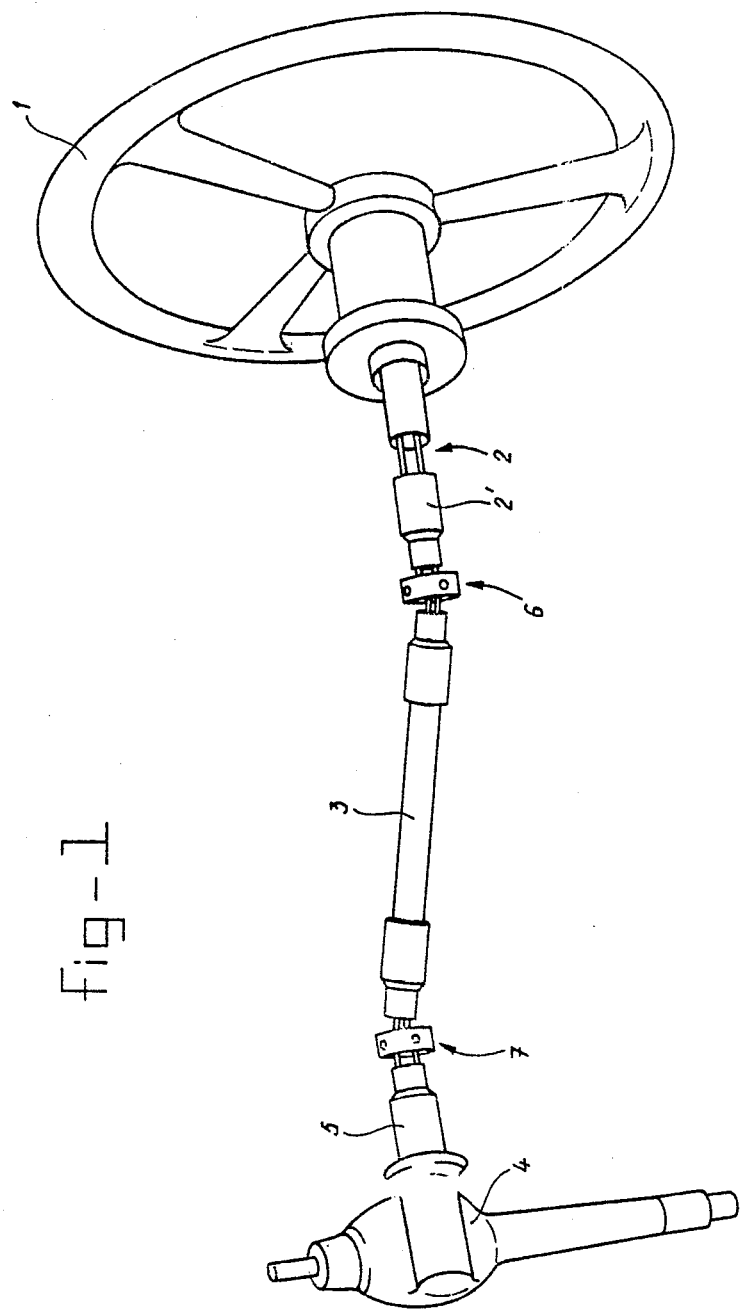

United States Patent [19]

Kapaan

[11] Patent Number: 4,964,840
[45] Date of Patent: Oct. 23, 1990

[54] UNIVERSAL COUPLING HAVING A RING INTERMEDIATE ELEMENT

[75] Inventor: Hendrikus J. Kapaan, Nieuwegein, Netherlands

[73] Assignee: SKF Industrial Trading and Development Co. B.V., Nieuwegein, Netherlands

[21] Appl. No.: 478,046

[22] Filed: Feb. 1, 1990

Related U.S. Application Data

[63] Continuation of Ser. No. 390,457, Aug. 4, 1989, abandoned, which is a continuation of Ser. No. 130,089, Dec. 8, 1987, abandoned.

[30] Foreign Application Priority Data

Dec. 23, 1986 [NL] Netherlands ............... 8603282

[51] Int. Cl.$^5$ ............................................. F16D 3/42
[52] U.S. Cl. ..................................... 464/125; 464/117
[58] Field of Search ............... 464/106, 112, 114, 117, 464/125, 126, 147, 154

[56] References Cited

U.S. PATENT DOCUMENTS

| | | | |
|---|---|---|---|
| 1,275,051 | 8/1918 | Larson | 464/117 |
| 1,595,075 | 8/1926 | Culbertson | 464/117 |
| 1,651,850 | 12/1927 | Swenson | 464/117 |
| 2,655,798 | 10/1953 | Neher | 464/154 |
| 3,148,517 | 9/1964 | Kinser | 464/117 |
| 3,600,969 | 7/1969 | Pitner | 464/117 X |
| 4,121,437 | 10/1978 | Michel | 464/125 X |
| 4,543,076 | 9/1985 | Andersson | 464/152 |

FOREIGN PATENT DOCUMENTS 583296 12/1946 United Kingdom ................... 464/92

Primary Examiner—Daniel P. Stodola
Attorney, Agent, or Firm—Rosen, Dainow & Jacobs

[57] ABSTRACT

A steering control mechanism of a vehicle steering box connected to a steering wheel through a shaft and a coupling for coupling two generally shaft-shaped elements in such manner that a rotational force can be transferred from one element to the other whereby the cardioids of these elements can form different angles with each other, including an intermediate element to which two swivelling coupling elements are connected, each of which is connected to the shaft and each of which has two opposing parts located on both sides of the cardioid of the swivelling coupling element which are connected to, and rotate around the intermediate element so that the one swivelling coupling element can swivel in one plane and the other swivelling coupling element can swivel in a plane perpendicular to the first, with regard to the intermediate element, the intermediate element being generally an endless section or an annular part, and that the opposing parts of each swivelling coupling element are formed by two pivot pins located inside said annular intermediate element and projecting radially outward with regard to the cardioid of a pivot coupling element, each of the pivot coupling elements being carried on bearings in the annular intermediate element and capable of rotating around its cardioid.

6 Claims, 4 Drawing Sheets

UNIVERSAL COUPLING HAVING A RING INTERMEDIATE ELEMENT

This application is a continuation of application Ser. No. 390,457, filed August 4, 1989, now abandoned, which is a continuation of application Ser. No. 07/130,089, filed Dec. 8, 1987, now abandoned.

The invention concerns a coupling for coupling two generally shaft-shaped elements in such manner that a rotational force can be transferred from one element to the other whereby the cardioids of these elements can form different angles with each other, in particular for application in the steering column of a vehicle, including an intermediate element to which two swivelling coupling elements are connected each of which is, or can be, connected to a shaft and each of which has two opposing parts located on both sides of the coupling element which are connected to, and can rotate around, the intermediate element, so that the one coupling element can swivel in one plane and the other coupling element can swivel in a plane perpendicular to the first, with regard to the intermediate element. A similar coupling is generally known.

In the known coupling the intermediate element is formed by a cruciform component and each coupling is formed by a bracket-type component with two cheeks running parallel at a distance from one another, each equipped with an opening encircling an arm of the cruciform intermediate element so it can rotate, with the intervention of a needle bearing.

The known coupling is relatively expensive, mainly because special tools are needed for its assembly and because, once assembled, the coupling cannot, or only with great difficulty, be disassembled. In addition, the construction of this coupling allows only a limited angle of rotation (32°).

Moreover, the coupling elements must be connected to the shafts by means of bolts, so that when they are applied to the steering column of a vehicle—which usually requires two of these couplings—especially adapted steering columns must be designed for each type of vehicle, because the steering columns of different types of vehicles differ in length.

The objective of the invention is to provide a coupling of the type mentioned which allows a greater angle of rotation, is cheaper than the known coupling and easy to disassemble, while satisfying, at the same time, safety and operation regulations when applied in steering columns, especially with regard to a flexible and easy transmission of the rotational force, the need to be free of vibrations and the need to break when the car is involved in a collision.

This objective is met on account of the fact that in the coupling according to the invention the intermediate element is generally an endless section or annular part and the opposing parts of each coupling element are constituted by two pivot pins located inside the annular intermediate element and projecting radially outward with regard to the cardioid of the coupling element, and each is carried by bearings so they can rotate around their cardioids inside the annular intermediate element.

In a first form of execution each pivot pin is constitued by a projection formed near the one end of an extended arm and perpendicular thereto, whereby the two arms running parallel at a distance to one another are held at their other ends by a holder. In an advantageous manner the holder is formed by an annular bracket to which the arms are attached so they can be removed.

A coupling executed in this manner allows a greater angle of rotation, i.e. between 40° and 45°, and is relatively cheap mainly because no special tools are needed to assemble it and because, once assembled, it is easy to disassemble.

In a second form of execution the pivot pins are constituted by the ends—bent at right angles—of two rods running parallel to one another and contained in a generally rod-shaped holder.

In an advantageous execution the outer surface of the holder has at least two diametrically opposed recesses in which said rods are held while sliding lengthwise whereby, in applications on steering columns, the distance between two couplings, and/or the distance between a coupling and the steering-wheel mechanism, and/or the distance between a coupling and the steering-box mechanism can be changed in a simple manner at the wheels to be steered, so that a single complete steering wheel can be used for different types of vehicles.

The holder may also be formed by a sleeve which has two diametrically opposed indentations forming two containment spaces inside the sleeve for holding the rods.

In an advantageous manner, between each rod and the side-walls, formed by indentations, of the rod-containing space in the holder, elements of a flexible material are inserted to dampen the vibrations in the steering box.

The coupling elements may also be formed by a solid shaft at one end of which two opposing projections are formed constituting the pivot pins, and at the other end of which means of attachment have been provided.

Accordingly, a similar coupling element may be fastened to the shaft of a steering column in such manner that the fastening force does not affect the proper functioning of the coupling.

In this context it is advantageous for the projections to be formed by spherical elements contained in spaces formed inside the intermediate element.

In a coupling according to the invention it is advantageous to attach each of the pivot pins by means of a sleeve bushing so they can rotate in an opening in the annular intermediate element. Consequently, it is not necessary to use needle bearings, though it is possible.

The invention is further explained with reference to the drawing in which

FIG. 1 shows a steering column for a vehicle containing two couplings according to the invention.

Figure 2:
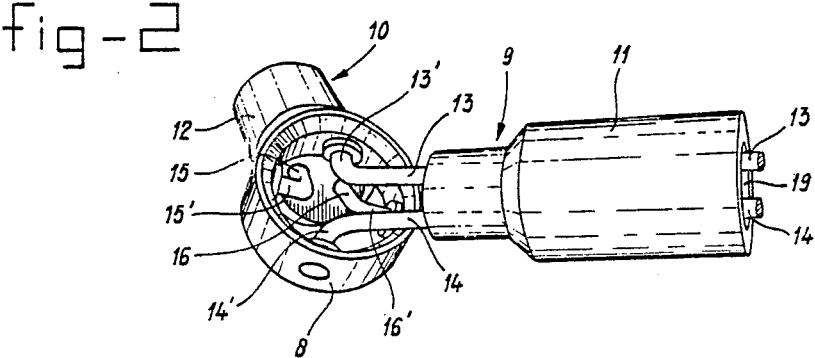
Figure 3:
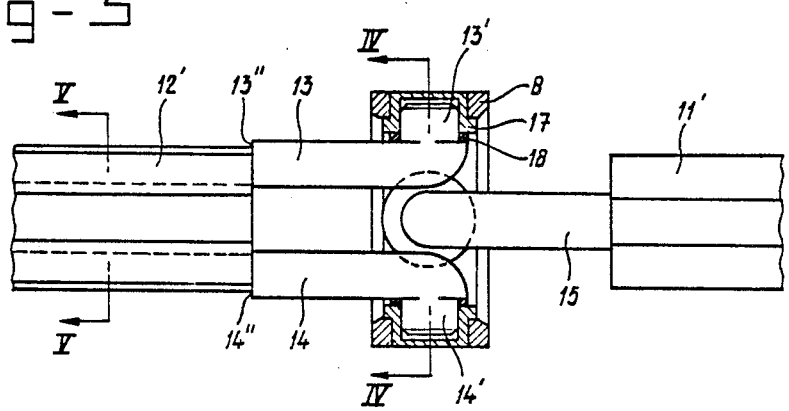
Figure 4:
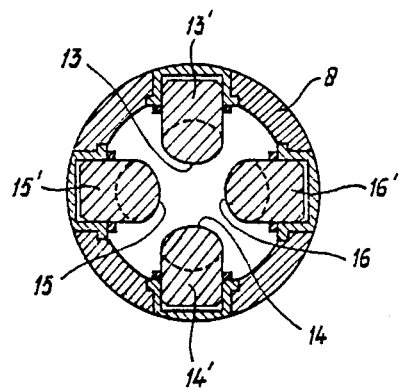
Figure 5:
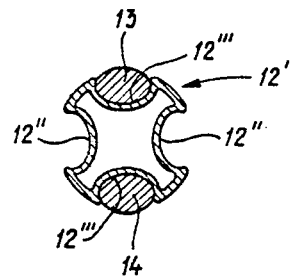
Figure 6:
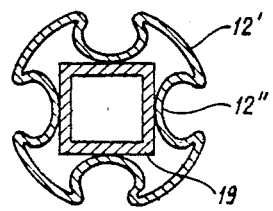
Figure 7:
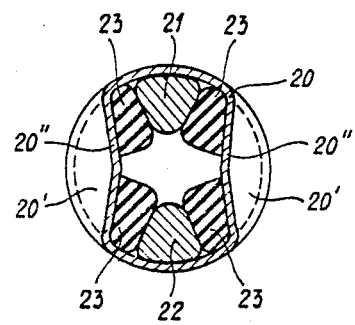
Figure 8:
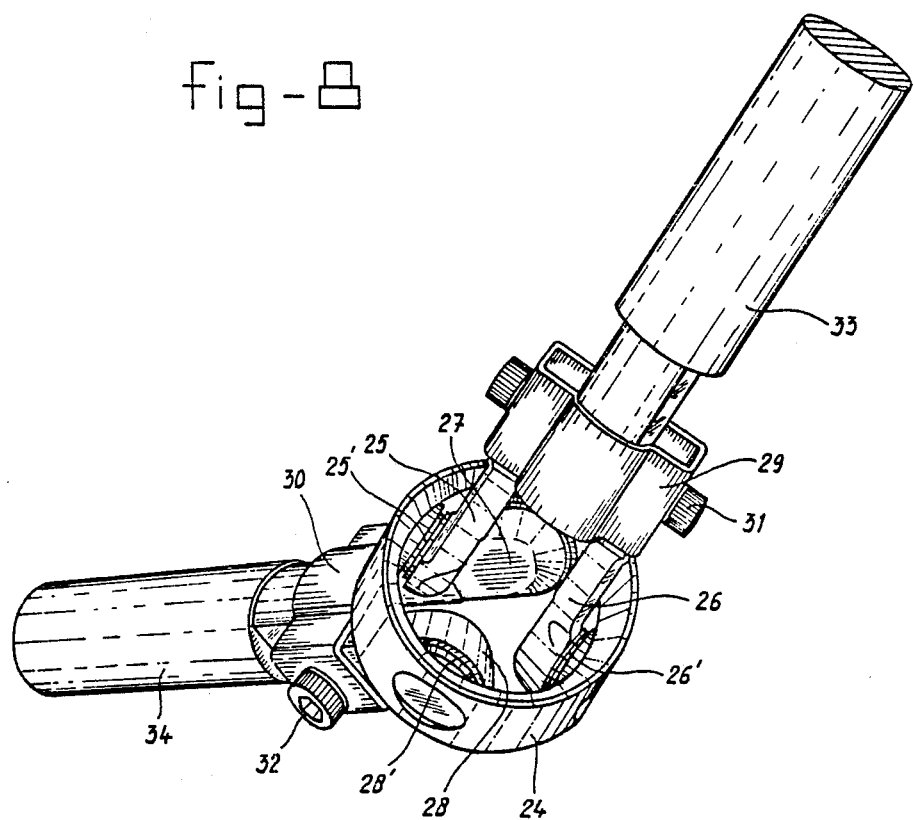
Figure 9:
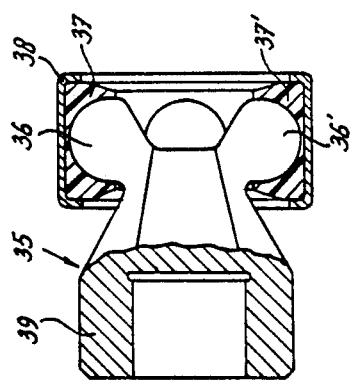
Figure 10:
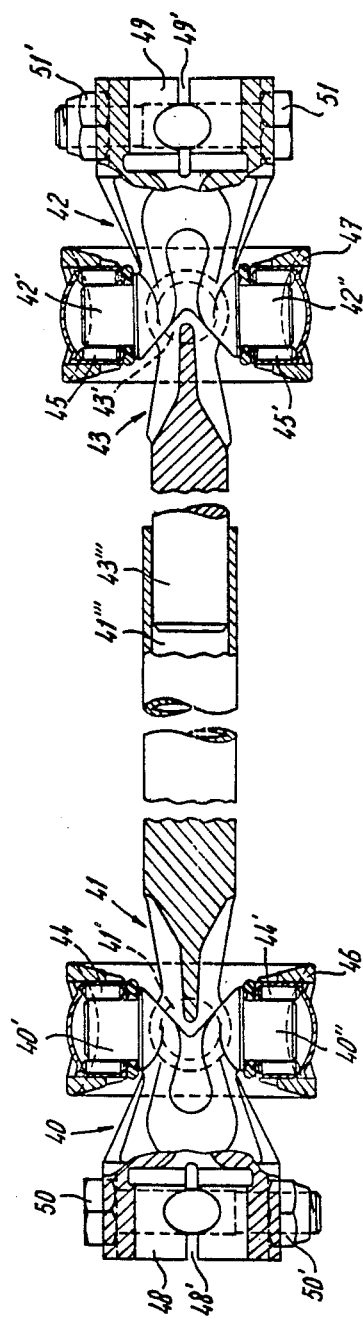

FIG. 2 shows one of the couplings applied to the steering column according to FIG. 1, FIG. 3 represents a cross-section of the coupling according to FIG. 2, FIG. 4 is a cross-section according to the line IV—IV in FIG. 3, FIG. 5 is a cross-section according to the line V—V in FIG. 3, FIGS. 6 and 7 are cross-sections of holders of a different form, FIG. 8 shows a second form of execution of the coupling according to the invention, FIG. 9 shows a third form of execution of the coupling according to the invention, and FIG. 10 represents a variation of the coupling according to FIG. 9.

As shown in FIG. 1 the steering column involves a part 2 connected to the steering wheel 1 with an energy-absorbing part 2', an intermediate shaft 3 and a shaft 5 connected to the steering box 4. Part 2 is connected via the coupling 6 with the intermediate shaft 3 and the intermediate shaft 3 is connected via the coupling 7 with the steering box shaft 5.

As shown in FIGS. 2 and 3, the couplings 6 and 7 each include an annular intermediate element 8 and two coupling elements 9 and 10, each of which are constituted by a holder 11 or 12 and two parallel rods 13, 14 or 15, 16, whose ends 13', 14' or 15', 16' are bent at right angles to form pivot pins carried in openings in the intermediate element 8. In this design, the pivot pins 13' and 14' are oriented according to a center line of the annular intermediate element 8, and the pivot pins 15' and 16' according to a center line of the annular intermediate element 8 perpendicular to the first.

Each pivot pin 13', 14', 15', 16' is carried by means of a sleeve bushing 17 in an opening in the annular intermediate element 8, with the addition of sealing rings 18.

As shown in FIG. 2, each holder 11, 12 consists of an essentially solid shaft in which two parallel guide ways have been drilled at a distance to one another for receiving the rods 13, 14 or 15, 16, and a central guide way 19 to which a shaft, in particular part of a steering column, is attached.

FIG. 3 shows another form of execution of the holders 11' and 12'. As appears in particular from FIG. 5, the holder consists of a sleeve on whose outer surface recesses 12" and 12''' are formed diametrically opposed to one another, which recesses serve to receive the rods 13, 14 or 15, 16. These rods are placed in the recesses up to the shoulders 13", 14" formed on the latter.

As shown in FIG. 6, a sleeve 19 with a square cross-section may be inserted in the holder 12' for reinforcement.

The holder shown in FIG. 7 in cross-section consists of a cylindrical sleeve in which indentations 20' have been formed extending over a certain length of the sleeve from its end facing the annular intermediate element. The inwardly indented wall sections 20" create containment spaces inside the sleeve 20 in which the rods 21, 22 are placed with the intervention of elements 23 made of a flexible material.

In the form of execution of the coupling according to the invention shown in FIG. 8 the intermediate element 24 is again annular but, in this form of execution, the coupling elements are each constituted by two extended arms 25, 26 and 27, 28, whereby the pivot pins are each constituted by a projection 25', 26' and 27', 28', formed on the one end of the extended arm—and perpendicular thereto—located inside the intermediate element 24 (pivot pin 27' is not visible in FIG. 8). These pivot pins are carried by bearings in the same manner as shown in FIGS. 3 and 4, by means of a sleeve bushing in openings in the annular intermediate element 24.

In this form of execution the holders are each formed by an annular bracket 29 or 30 containing the arms 25, 26 or 27, 28. The ends of the arms 25, 26 or 27, 28 located inside the brackets 29, 30 have openings which coincide with openings in the sides of the brackets, so that bolts 31, 32 can be inserted through these openings and an opening in the shaft 33, 34 involved. By simply removing the bolts 31, 32 it is possible not only to uncouple the coupling from the shafts 33, 34, but also to disassemble the coupling by sliding the brackets 29, 30 off the arms 25, 26 and 27, 28, and taking the pivot pins of these arms out of the sleeve bushings.

In the form of execution according to FIG. 9 the couplings 35—of which only one is shown—are constituted by a solid shaft on one end of which two opposing spherical parts 36, 36' are formed. The four spherical parts are contained in spaces restricted by four identical elements 37, 37' made of a synthetic material, and inserted inside the annular intermediate element 38. At the other end the shafts are formed into attachment clamps 39 to which the shaft of a steering column can be attached.

As shown in FIG. 10, the coupling elements 40, 41, 42 and 43 are also formed by a solid shaft. However, in this instance pivot pins 40', 40''; 42', 42'' are formed on these parts which are carried by means of needle bearings 44, 44'; 45, 45' in the intermediate element 46, 47. At their other ends, the coupling elements 40 and 42 are again executed as an attachment clamp, because a space 48, 49 is formed with a slot 48', 49' running across the wall, which can be clamped around a shaft by means of the bolt 50, 51 with the nut 50', 51'. At the other end 41''', the coupling element 41 is hollow so that this space can receive the solid end 43''' of the intermediate element 43.

I claim:

1. In a steering control mechanism for a vehicle steering box connected to a steering wheel through a shaft and a coupling for coupling two generally shaft-shaped elements such that a rotational force can be transferred from one element to the other whereby the cardioids of these elements can form different angles with each other, an intermediate element, two swivelling coupling elements connected to said intermediate element, each of said two swivelling coupling elements having pivots being connected to said shaft and each of which has two opposing parts located on both sides of the cardioid of the swivelling coupling element which are connected to, and pivot around, the intermediate element, so that one of said swivelling coupling elements swivel in one plane and the other of said swivelling coupling elements swivel in a plane perpendicular to the first, with regard to the intermediate element, the improvement comprising: said intermediate element being annular, said opposing parts of each swivelling coupling element being connected to said annular intermediate element by two pivot pins located inside said annular intermediate element and projecting radially outward with regard to the cardioid of the pivot of said swivelling coupling elements, each of said pivot pins being carried on bearings in the annular intermediate element and capable of rotating around its cardioid, wherein each of said swivelling coupling elements comprises an extended arm having one end and means for holding said rods in an axially adjustable position wherein each pivot pin comprises a projection formed near the one end of the extended arm and perpendicular thereto, whereby the two extended arms running parallel at a distance to one another are held at their other ends by a separate holder means for holding said rods in an axially adjustable position.

2. In a steering control mechanism for a vehicle steering box connected to a steering wheel through a shaft and a coupling for coupling two generally shaft-shaped elements such that a rotational force can be transferred from one element to the other whereby the cardioids of these elements can form different angles with each other, an intermediate element, two swivelling coupling elements connected to said intermediate element, each of said two swivelling coupling elements having pivots being connected to said shaft and each of which has two opposing parts located on both sides of the cardioid of the swivelling coupling element which are connected to, and pivot around, the intermediate element, so that one of said swivelling coupling elements swivel in one plane and the other of said swivelling coupling elements swivel in a plane perpendicular to the first, with regard to the intermediate element, the improvement comprising: said intermediate element being annular, said opposing parts of each swivelling coupling element being connected to said annular intermediate element by two pivot pins located inside said annular intermediate element and projecting radially outward with regard to the cardioid of the pivot of said swivelling coupling elements, each of said pivot pins being carried on bearings in the annular intermediate element and capable of rotating around its cardioid, wherein each of said swivelling coupling elements comprises an extended arm having one end and wherein each pivot pin comprises a projection formed near the one end of the extended arm and perpendicular thereto, whereby the two extended arms running parallel at a distance to one another are held at their other ends by a holder which is formed by an annular bracket having an inner circumference within which said extended arms are attached so that they can be removed.

3. In a steering control mechanism for a vehicle steering box connected to a steering wheel through a shaft and a coupling for coupling two generally shaft-shaped elements such that a rotational force can be transferred from one element to the other whereby the cardioids of these elements can form different angles with each other, an intermediate element, two swivelling coupling elements connected to said intermediate element, each of said two swivelling coupling elements having pivots being connected to said shaft and each of which has two opposing parts located on both sides of the cardioid of the swivelling coupling element which are connected to, and pivot around, the intermediate element, so that one of said swivelling coupling elements swivel in one plane and the other of said swivelling coupling elements swivel in a plane perpendicular to the first, with regard to the intermediate element, the improvement comprising: said intermediate element being annular, said opposing parts of each swivelling coupling element being connected to said annular intermediate element by two pivot pins located inside said annular intermediate element and projecting radially outward with regard to the cardioid of the pivot of said swivelling coupling elements, each of said pivot pins being carried on bearings in the annular intermediate element and capable of rotating around its cardioid wherein each of said swivelling coupling elements comprises an extended arm having one end and wherein each pivot pin comprises a projection formed near the one end of the extended arm and perpendicular thereto, whereby the two extended arms running parallel at a distance to one another are held at their other ends by a holder means and wherein said pivot pins are formed by the ends bent at right angles of two rods running parallel to one another in said holder means, said holder means holding said rods in an axially adjustable position.

4. The mechanism according to claim 3, wherein the outer surface of said holder has at least two diametrically opposed recesses in which said rods are held while slidable lengthwise.

5. The mechanism according to claim 3, wherein said holder is formed by a sleeve which has two diametrically opposed indentations which form two containment spaces inside said sleeve for inserting the rods.

6. The mechanism according to claim 5, wherein between each said rod and the side-walls, formed by said indentations, of the rod-containing recess in said holder means, elements of a flexible material are disposed.

* * * * *